United States Patent
Isaji et al.

(10) Patent No.: US 9,739,965 B2
(45) Date of Patent: Aug. 22, 2017

(54) OPTICAL FIBER RIBBON AND OPTICAL FIBER CABLE HOUSING THE OPTICAL FIBER RIBBON

(71) Applicants: FUJIKURA LTD., Koto-ku, Tokyo (JP); NIPPON TELEGRAPH AND TELEPHONE CORPORATION, Chiyoda-ku, Tokyo (JP)

(72) Inventors: Mizuki Isaji, Chiba (JP); Yoshie Sajima, Yotsukaido (JP); Ken Osato, Sakura (JP); Naoki Okada, Yotsukaido (JP); Takashi Matsuzawa, Sakura (JP); Yukiko Take, Sakura (JP); Yusuke Yamada, Tsukuba (JP); Shinya Hamaguchi, Tsukuba (JP); Daisuke Kakuta, Tsukuba (JP); Hisaaki Nakane, Tsukuba (JP)

(73) Assignees: FUJIKURA LTD., Tokyo (JP); NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 14/471,944

(22) Filed: Aug. 28, 2014

(65) Prior Publication Data
US 2015/0049997 A1 Feb. 19, 2015

Related U.S. Application Data

(63) Continuation of application No. PCT/JP2013/055138, filed on Feb. 27, 2013.

(30) Foreign Application Priority Data

Mar. 2, 2012 (JP) .................................. 2012-046443

(51) Int. Cl.
*G02B 6/44* (2006.01)

(52) U.S. Cl.
CPC .......... *G02B 6/4403* (2013.01); *G02B 6/4495* (2013.01)

(58) Field of Classification Search
CPC .................................................... G02B 6/4403
See application file for complete search history.

(56) References Cited

U.S. PATENT DOCUMENTS 4,590,492 A 5/1986 Meier
5,159,656 A 10/1992 Goldstein
(Continued)

FOREIGN PATENT DOCUMENTS

CN 1942798 A 4/2007
JP 09-197210 A 7/1997
(Continued)

OTHER PUBLICATIONS

International Search Report for PCT/JP2013/055138 dated Apr. 2, 2013.
(Continued)

*Primary Examiner* — Uyen Chau N Le
*Assistant Examiner* — Chris Chu
(74) *Attorney, Agent, or Firm* — Sughrue Mion, PLLC (57) ABSTRACT

Provided is an optical fiber ribbon capable of concurrently ensuring mid-span access performance and cable production performance. The optical fiber ribbon 1 includes three or more optical fibers 2 arranged in parallel and connecting portions 3 connecting the adjacent optical fibers 2, the connecting portions 3 being formed intermittently in each of a ribbon longitudinal direction X and a ribbon width direction Y. The optical fiber ribbon 1 including the connecting portions 3 having split strength which is set in the range from 1.50 gf to 21.0 gf, contributes to exhibiting both the
(Continued)

mid-span access performance and the cable production performance.

3 Claims, 6 Drawing Sheets

(56) References Cited

U.S. PATENT DOCUMENTS

| | | | |
|---|---|---|---|
| 6,563,990 B1 * | 5/2003 | Hurley | G02B 6/4422 385/101 |
| 6,584,257 B1 | 6/2003 | Hurley et al. | |
| 2006/0088258 A1 | 4/2006 | Sasaki et al. | |
| 2007/0081774 A1 | 4/2007 | Suzuki et al. | |
| 2008/0056653 A1 | 3/2008 | Sato et al. | |
| 2011/0110635 A1 | 5/2011 | Toge et al. | |

FOREIGN PATENT DOCUMENTS

| | | |
|---|---|---|
| JP | 11-231183 A | 8/1999 |
| JP | 2000-131577 A | 5/2000 |
| JP | 2002-328282 A | 11/2002 |
| JP | 2003-232972 A | 8/2003 |
| JP | 2003-241041 A | 8/2003 |
| JP | 2005-537509 A | 12/2005 |
| JP | 4143651 A | 10/2007 |
| JP | 2009-093077 A | 4/2009 |
| JP | 2011-169937 A | 9/2011 |
| JP | 2011-221163 A | 11/2011 |
| TW | 200613789 A | 5/2006 |
| TW | 200639459 A | 11/2006 |
| WO | 2004/021060 A1 | 3/2004 |
| WO | 2010/001663 A1 | 1/2010 |

OTHER PUBLICATIONS

Written Opinion for PCT/JP2013/055138 dated Apr. 2, 2013.
Summary of Notification of Reasons for Refusal 2012-046443 dated Apr. 9, 2013.
Summary of Notification of Reasons for Refusal 2012-046443 dated Jun. 25, 2013.
Communication dated Nov. 5, 2015 from the Russian Patent Office in counterpart application No. 2014139908/28.
Communication dated Feb. 8, 2016, issued by the Australian Patent Office in counterpart Australian Application No. 2013226965.
Communication dated Oct. 27, 2015 from the Canadian Intellectual Property Office issued in Canadian application No. 2866018.
Communication dated Aug. 31, 2015 from the Australian Patent Office in counterpart application No. 2013226965.
Communication dated Oct. 2, 2015, issued by the European Patent Office in corresponding European Application No. 13754503.4.
Communication dated Oct. 24, 2016, from the State Intellectual Property Office of People's Republic of China in Chinese Application No. 201380012235.6.
Communication dated Aug. 3, 2016 from the Taiwanese Intellectual Property Office in counterpart Application No. 102107254.

* cited by examiner

[Table 3]

| Sample | Cross section of connecting portion | Maximum thickness [μm] | Increase amount of maximum loss during mid-span access [dB] | Result |
|---|---|---|---|---|
| A | 3a 3c 3b ⬭ 3 | 20 | 0.01 or less | ○ |
| B | | 50 | 0.01 or less | ○ |
| C | | 150 | 0.05 | ○ |
| D | | 320 | 0.04 | ○ |
| E | | 400 | 0.15 | × |
| F | 3a 3c 3b ⬯ 3 | 150 | 0.12 | × |
| G | | 250 | 0.32 | × |
| H | | 400 | 0.33 | × |
| I | 3a 3c 3b ⬰ 3 | 150 | 0.15 | × |
| J | | 250 | 0.42 | × |
| K | | 400 | 0.45 | × |

FIG. 8

[Table 4]

| Sample | Cross section of connecting portion | Maximum thickness [μm] | Occurrence of breakup of connecting portion in cable after test | Result |
|---|---|---|---|---|
| A | 3a 3c 3b ⬭ 3 | 20 | Occurred | × |
| B | | 50 | None | ○ |
| C | | 150 | None | ○ |
| D | | 320 | None | ○ |
| E | | 400 | None | ○ |
| F | 3a 3c 3b ⌇ 3 | 150 | None | ○ |
| G | | 250 | None | ○ |
| H | | 400 | None | ○ |
| I | 3a 3c 3b ⌇ 3 | 150 | None | ○ |
| J | | 250 | None | ○ |
| K | | 400 | None | ○ |

OPTICAL FIBER RIBBON AND OPTICAL FIBER CABLE HOUSING THE OPTICAL FIBER RIBBON

CROSS-REFERENCE TO RELATED APPLICATION

The application is a Continuation of PCT Application No. PCT/JP2013/055138, filed on Feb. 27, 2013, and claims the benefit of priority from the prior Japanese Patent Application No. 2012-046443, filed on Mar. 2, 2012, the entire contents of which are incorporated herein by reference.

BACKGROUND OF THE INVENTION

The present invention relates to an optical fiber ribbon having an intermittently-fixed structure in which optical fibers adjacent to each other are intermittently connected with connecting portions, and also relates to an optical fiber cable housing the optical fiber ribbon.

BACKGROUND ART

There has been an increased demand for higher density and reduction in diameter in the technical field of optical fiber cables. For example, Patent Literature 1 teaches an example of measures to achieve higher density and reduction in diameter in an optical fiber cable.

An optical fiber ribbon described in Japanese Patent No. 4143651 (Patent Literature 1) has a configuration in which a plurality of connecting portions connecting adjacent two optical fibers of three or more optical fibers arranged in parallel are two-dimensionally and intermittently arranged in each of a longitudinal direction and a width direction of the optical fiber ribbon, a length of each of the connecting portions arranged in one optical fiber is set to be shorter than that of each of unconnected portions in the same optical fiber, and the respective adjacent connecting portions in the width direction of the optical fiber ribbon are offset in the longitudinal direction of the optical fiber ribbon and arranged in a zigzag manner so as not to overlap each other in the width direction.

Here, this type of optical fiber ribbon is greatly influenced by strength of connecting portions with regard to both cable production performance and mid-span access performance which is a process of extracting an arbitrary optical fiber in a middle portion of an optical fiber cable.

For example, if the strength of the connecting portions is excessively high, transmission loss at the time of mid-span access of live wires increases because of tensile force caused when the connecting portions are separated. On the other hand, if the strength of the connection portions is too low, the connecting portions are broken up and the optical fibers are thus separated if the optical fiber ribbon is locally bent at the time of cable production, installation, and the like so that ribbon differentiation during the operation of installation may not be possible.

SUMMARY

An object of the present invention is to provide an optical fiber ribbon capable of concurrently ensuring mid-span access performance and cable production performance and to provide an optical fiber cable housing the optical fiber ribbon.

A first invention provides an optical fiber ribbon including three or more optical fibers arranged in parallel and connecting portions connecting the respective adjacent two optical fibers, the connecting portions being formed intermittently in each of a ribbon longitudinal direction and a ribbon width direction, wherein split strength of the connecting portions is in a range from 1.50 gf to 21.0 gf.

A second invention provides the optical fiber ribbon according to the first invention, wherein the connecting portions each have a thickness in cross section in the ribbon longitudinal direction that gradually increases in an arc from one side towards a middle, is thickest in the middle and gradually decreases in an arc towards another side.

A third invention provides the optical fiber ribbon according to the second invention, wherein the thickest thickness of the respective connecting portions is in a range from 50 µm to 320 µm.

A fourth invention provides an optical fiber cable housing the optical fiber ribbon according to any one of the first to third inventions.

According to the present invention, the split strength of the connecting portions connecting the respective adjacent two optical fibers is set in the range from 1.50 gf to 21.0 gf, which can prevent transmission loss of the optical fibers while the connecting portions are split at the time of mid-span access, and can prevent the connecting portions from being unintentionally broken up so as to prevent the optical fibers from being separated when the optical fiber ribbon is produced or installed. Accordingly, the mid-span access performance and the cable production performance can be ensured concurrently.

DESCRIPTION OF EMBODIMENT

Hereinafter, a specific embodiment to which the present invention is applied will be explained in detail below with reference to the drawings.

Figure 1:
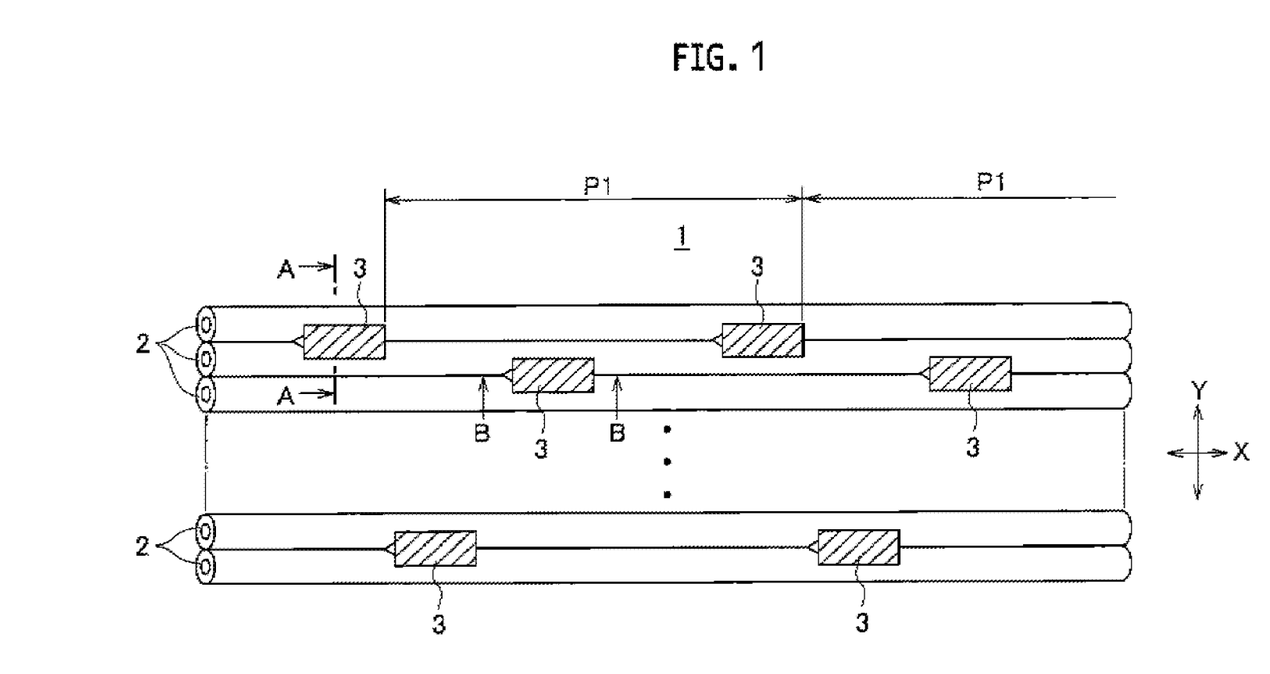
FIG. 1 is an upper perspective view showing an example of an optical fiber ribbon according to the present embodiment.
Figure 2A:
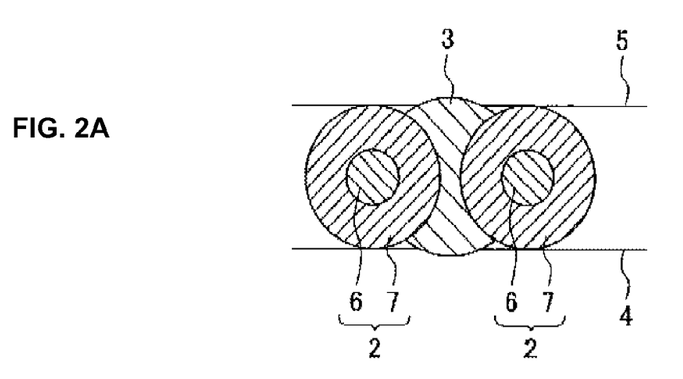
FIG. 2A is a cross-sectional view taken along the line A-A of a connecting portion of the optical fiber ribbon shown in FIG. 1.
Figure 2B:
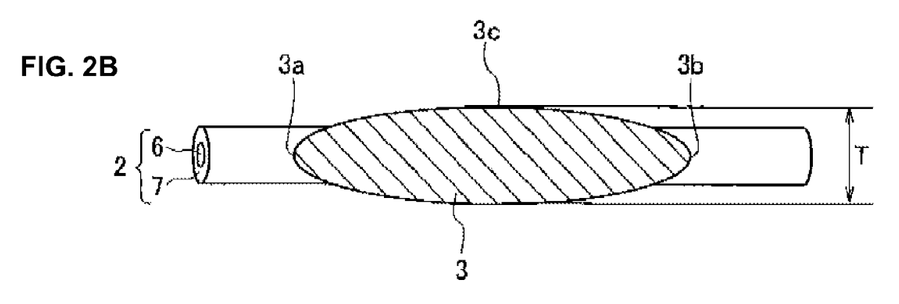
FIG. 2B is a cross-sectional view taken along the line B-B of the same.

FIG. 1 shows an example of an optical fiber ribbon having an intermittently-fixed structure according to the present embodiment. FIG. 2A is a cross-sectional view taken along the line A-A of a connecting portion in FIG. 1, and FIG. 2B is a cross-sectional view taken along the line B-B of the same. As shown in FIG. 1, the optical fiber ribbon 1 according to the present embodiment has a configuration in which three or more optical fibers 2 are arranged in parallel, the respective adjacent two optical fibers are connected with connecting portions 3, and the connecting portions 3 are intermittently arranged in each of a ribbon longitudinal direction (a direction of arrow X in FIG. 1) and a ribbon width direction (a direction of arrow Y in FIG. 1).

FIG. 1 shows the optical fibers 2 of which the number is n in total. The respective adjacent optical fibers 2 of the n optical fibers 2 are intermittently connected with the connecting portions 3 in each of the ribbon longitudinal direction X and the ribbon width direction Y. The plural connecting portions 3 connecting the respective adjacent two optical fibers 2 are formed at predetermined pitches P1 in the ribbon longitudinal direction Y.

Here, there is only one connecting portion 3 arranged in each line in the ribbon width direction Y to connect the respective adjacent optical fibers 2. One connecting portion 3 connecting adjacent two optical fibers 2 is not located in the same line in the ribbon width direction Y as other connecting portions 3 connecting other adjacent two optical fibers 2 but is located at an offset position from the other connecting portions 3 in the ribbon longitudinal direction X. Therefore, the connecting portions 3 formed in the optical fiber ribbon 1 are arranged in a zigzag manner as a whole. It should be noted that the arrangement of the connecting portions 3 is not limited to that shown in FIG. 1 and may be other configurations. The arrangement shown in FIG. 1 is merely an example. Here, in addition to the arrangement in which only one connecting portion 3 is arranged in each line in the ribbon width direction Y, two or more connecting portions 3 may be aligned in the ribbon width direction Y in a manner such that at least one unconnected portion is present between the adjacent connecting portions 3.

FIG. 2A shows a cross section in the ribbon width direction Y of the connecting portion 3 which is formed, for example, in such a manner as to fill a gap between the adjacent two optical fibers 2 with resin (for example, ultraviolet curable resin) and then cure it so as to connect the adjacent two optical fibers 2 together. The connecting portion 3 of this example is obtained in a manner such that the gap is filled with the resin to slightly protrude from lines 4 and 5 each connecting contact points of the optical fibers 2 in contact therewith when being placed on the horizontal surface. However, the configuration of FIG. 2A is an example, and the connecting portion 3 may be positioned inside the lines 4 and 5 instead.

Further, each connecting portion 3 has a configuration in cross section in the ribbon longitudinal direction X, as shown in FIG. 2B, in which the thickness thereof gradually increases in an arc from one side 3a towards the middle 3c, is thickest at the middle portion to be a maximum thickness T, and gradually decreases in an arc towards the other side 3b. In other words, the connecting portion 3 is formed into an oval having a thickness which is thin on both sides and thick at the middle portion. The position having the maximum thickness T is in the middle of the entire length of the connecting portion 3 in the ribbon longitudinal direction X but may include the middle portion or thereabouts.

The maximum thickness T of the connecting portion 3 is preferably in the range from 50 μm to 320 μm. The split strength of the connecting portion 3 is preferably in the range from 1.50 gf to 21.0 gf. The connecting portion 3 with the maximum thickness T and the split strength set to the above-mentioned ranges, can decrease transmission loss at the time of mid-span access and can be prevented from being broken at the time of cable production, installation, and the like. The evidence of such effects will be explained in Example below as a result of tests.

Each of the optical fibers 2 includes a bare glass optical fiber 6 provided in the center thereof and a cover layer 7 covering the circumference of the glass optical fiber 6. The diameter of the glass optical fiber 6 is, for example, 125 μm. The cover layer 7 includes a first cover layer and a second cover layer, the first cover layer being a relatively soft resin layer to absorb lateral pressure applied to the glass, the second cover layer being a relatively hard resin layer to protect against external damage. The second cover layer may be further covered with a colored layer so that the respective optical fibers 2 can be distinguished therebetween. The colored layer formed as an outermost layer can contribute to easily visually differentiating the respective optical fibers 2.

EXAMPLE

In the example, a 4-core optical fiber ribbon having an intermittently-fixed structure was manufactured, as shown in FIG. 1, in a manner such that four colored optical fibers each having a diameter of 250 μm were arranged in parallel and connected with connecting portions which were intermittently formed in each of a ribbon longitudinal direction and a ribbon width direction. The optical fibers used in the example were optical fibers conforming to ITU-T G.652B of the IEC standard.

Figure 3:
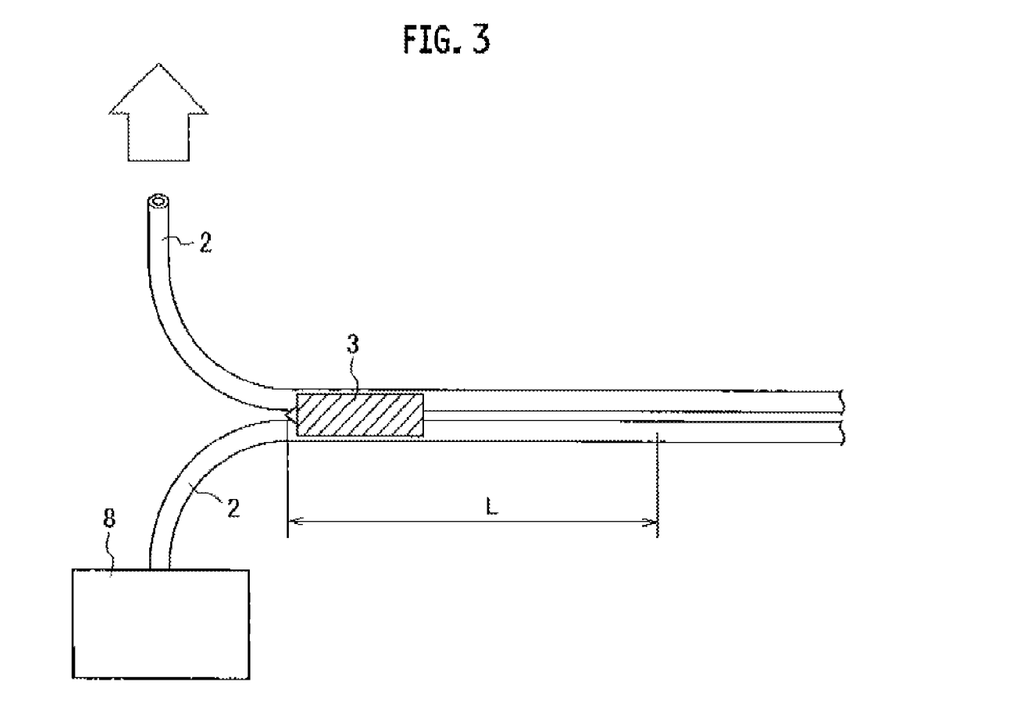
FIG. 3 is a schematic view showing a split testing machine for examining tensile strength of a connecting portion of the optical fiber ribbon shown in FIG. 1.

The optical fiber ribbon thus manufactured was subjected to a connecting portion split test and a mid-span access test in accordance with the following methods. As shown in FIG. 3, the connecting portion split test was carried out, for example, in a manner such that one of the four optical fibers 2 was fixe to a fixing jig 8, and another optical fiber 2 connected via the connecting portion 3 to the optical fiber 2 fixed to the fixing jig 8 was pulled in the direction away from the fixing jig 8, so that the split load of the connecting portion 3 was measured and the maximum load value thus obtained was defined as split strength.

The conditions of the split test are as follows. The distance between the connecting portion 3 and the fixing jig 8 in one optical fiber 2 and the distance between the connecting portion 3 and the tip of the other optical fiber 2 to be pulled were each set to 10 cm. In addition, a position which was 15 cm (distance L) away from the connecting portion 3 on the split side was fixed. Further, the optical fiber 2 was pulled at 100 mm/min.

Figure 4:
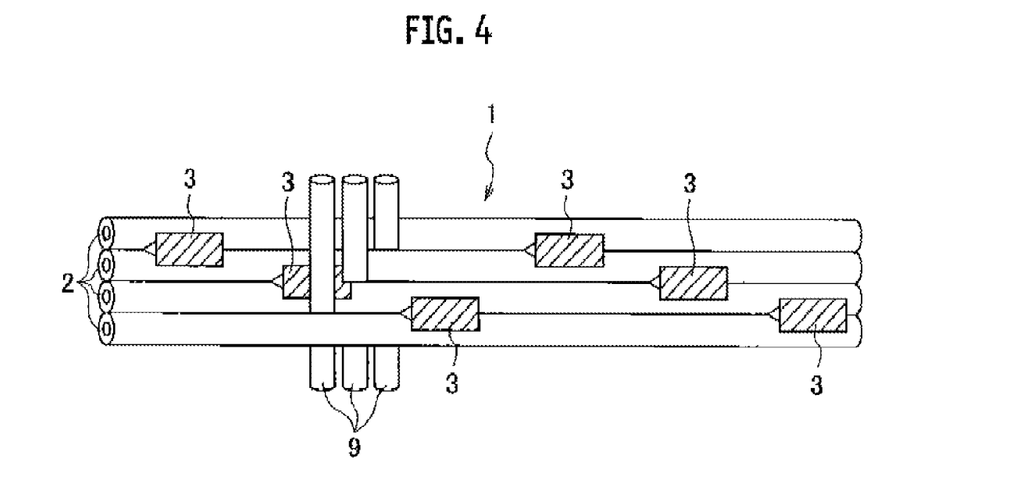
FIG. 4 is a view showing a method of mid-span access of the optical fiber ribbon shown in FIG. 1.
Figure 5:
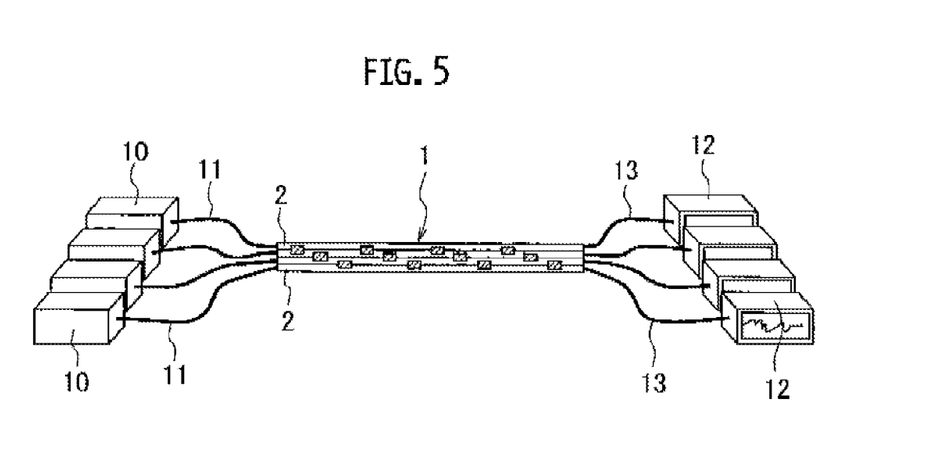
FIG. 5 is a schematic view showing a measurement device for measuring loss variations at the time of mid-span access of the optical fiber ribbon shown in FIG. 1.

The mid-span access test was also carried out, as shown in FIG. 4, in a manner such that each of access tools 9 composed of nylon cylindrical rods each having a diameter of approximately 200 μm was inserted between the respective adjacent optical fibers 2 and then moved in the ribbon longitudinal direction X so that the connecting portions 3 were split to carry out mid-span access. The loss variations were then measured by use of a measurement device as shown in FIG. 5. The measurement device used was obtained in a manner such that each light source 10 and each optical fiber 2 were connected via a connecting wire 11, each storage oscilloscope 12 and each optical fiber 2 were connected via a connecting wire 13, and light having a wavelength of 1.55 μm was introduced into the optical fibers 2 from the respective light sources 10 so as to measure the loss variations with the respective storage oscilloscopes 12 at a sampling cycle of 0.1 ms. The length of the optical fiber ribbon 1 was set to 10 m. Table 1 shows the results of the split test and the mid-span access test in each sample.

TABLE 1

| Split strength [gf] | Maximum loss during mid-span access [dB] | Result |
| --- | --- | --- |
| 0.2 | 0.01 or less | ○ |
| 0.9 | 0.01 or less | ○ |
| 1.5 | 0.01 | ○ |
| 8.2 | 0.03 | ○ |
| 10.5 | 0.03 | ○ |
| 21.0 | 0.05 | ○ |
| 25.2 | 0.18 | x |
| 42.0 | 0.52 | x |

It is apparent from Table 1 that the samples with the split strength of 21.0 gf or less each showed a good result that the maximum loss (the transmission loss) at the time of mid-span access was 0.1 dB or less.

Figure 6:
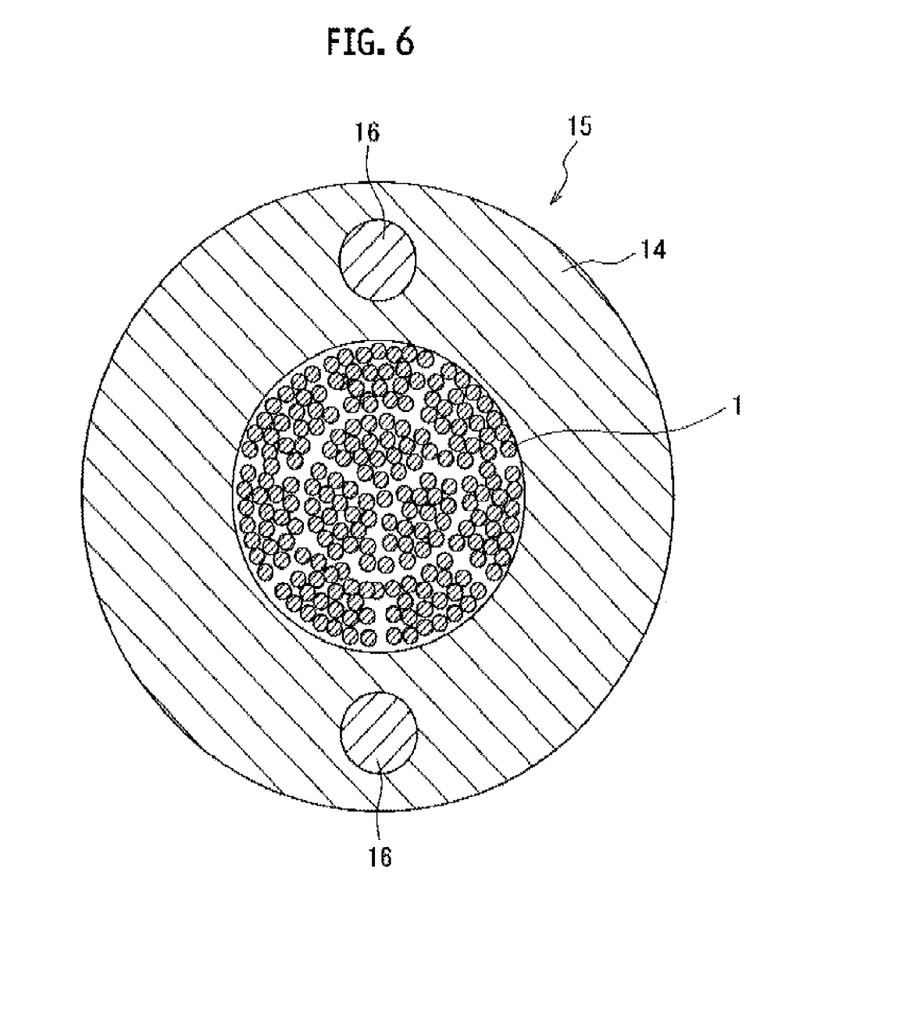
FIG. 6 is a cross-sectional view of an optical fiber cable obtained in a manner such that a plurality of optical fiber ribbons shown in FIG. 1 are covered with a sheath and housed in the cable.

Further, as shown in FIG. 6, an optical fiber cable 15 housing the 50 optical fiber ribbons 1 put together and covered with a sheath 14 was manufactured. The sheath 14 was made of polyethylene. The sheath 14 was provided with two tension members 16 therein. The optical fiber cable 15 including the 200 optical fibers was subjected to a sheave test with a tensile force of 130 kg, a mandrel diameter of 250 mm and a bending angle of 90°. The optical fiber cable 15 was then taken apart so as to determine whether the connecting portions were broken up. Table 2 shows the results thus obtained. The sheave test was carried out in accordance with the method shown in IEC 60794-1-2.

TABLE 2

| Split strength [gf] | Occurrence of breakup of connecting portion in cable | Result |
| --- | --- | --- |
| 0.2 | Occurred | x |
| 0.9 | Occurred | x |
| 1.5 | None | ○ |
| 8.2 | None | ○ |
| 10.5 | None | ○ |
| 21.0 | None | ○ |
| 25.2 | None | ○ |
| 42.0 | None | ○ |

It is apparent from Table 2 that the samples with the split strength of 1.50 gf or higher each showed a good result that the connecting portions 3 were not broken in the cable.

As an overall evaluation, the tests revealed that the optical fiber ribbon 1 having an intermittently-fixed structure exhibits good mid-span access performance when the split strength of the connecting portions 3 is within the range from 1.50 gf to 21.0 gf, and ensures high reliability without breakup of the connecting portions 3 in the cable at the time of cable production or the like.

Figure 7:
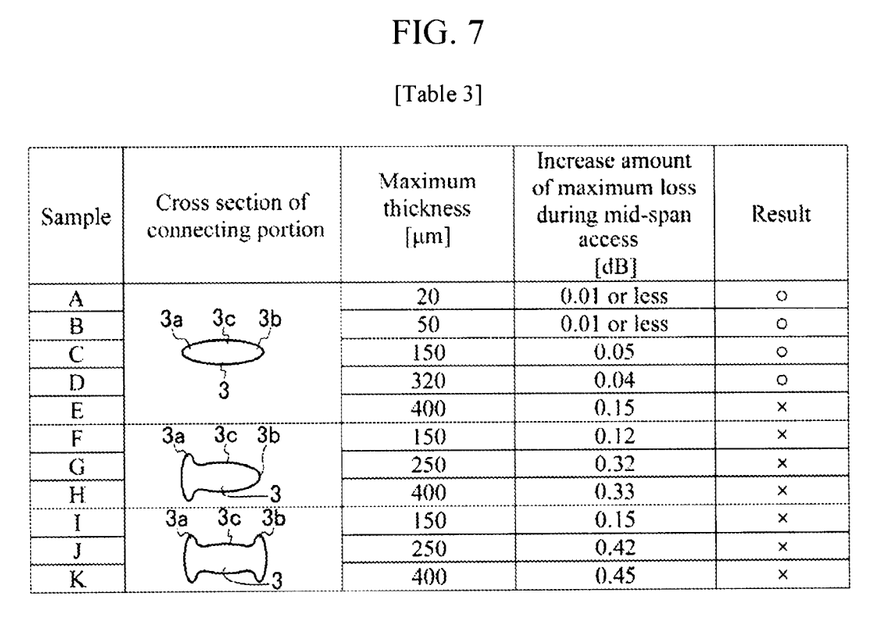
FIG. 7 is a view showing Table 3.

In addition, the split test of the connecting portions 3 and the mid-span access test were further carried out in such a manner as to change the cross-sectional shape in the ribbon longitudinal direction X in each connecting portion 3. The types of the cross-sectional shape of each connecting portion 3 prepared are as follows: the shape (samples A to E) according to the present invention shown in FIG. 2(B); the shape (samples F to H) shown in Table 3 (which is shown in FIG. 7) in which one end 3a is thicker than the middle 3c compared with the shape according to the present invention; and the shape (samples I to K) shown in Table 3 in which both ends 3a and 3b are thicker than the middle 3c compared with the shape according to the present invention.

In the respective shapes of the connecting portions 3, the thickness of the thickest portion was varied so as to prepare the respective samples A to K. The samples were each subjected to the split test and the mid-span access test described above. Table 3 shows the results thus obtained.

As is apparent from Table 3, when the thickest portion of the connecting portion 3 in cross section in the ribbon longitudinal direction X was located in the middle 3c and when the maximum thickness was 320 μm or less, the loss variation during mid-span access was 0.1 dB or less, which is effective at the time of mid-span access of live wires. In the samples F to K, on the other hand, each having the thickest portion at one end 3a or both ends 3a and 3b of the connecting portion 3, the maximum loss increased since great weight applied was required when the breakup of the connecting portions 3 was started.

Further, the optical fiber cable 15 manufactured in such a manner as to house the optical fiber ribbons 1 of the respective samples A to K as in the case of the cable shown in FIG. 6 was subjected to a sheave test. Table 4 (shown in FIG. 8) shows the results thus obtained. The number of the optical fiber ribbons 1 housed was 50, which is the same as the case described above.

Figure 8:
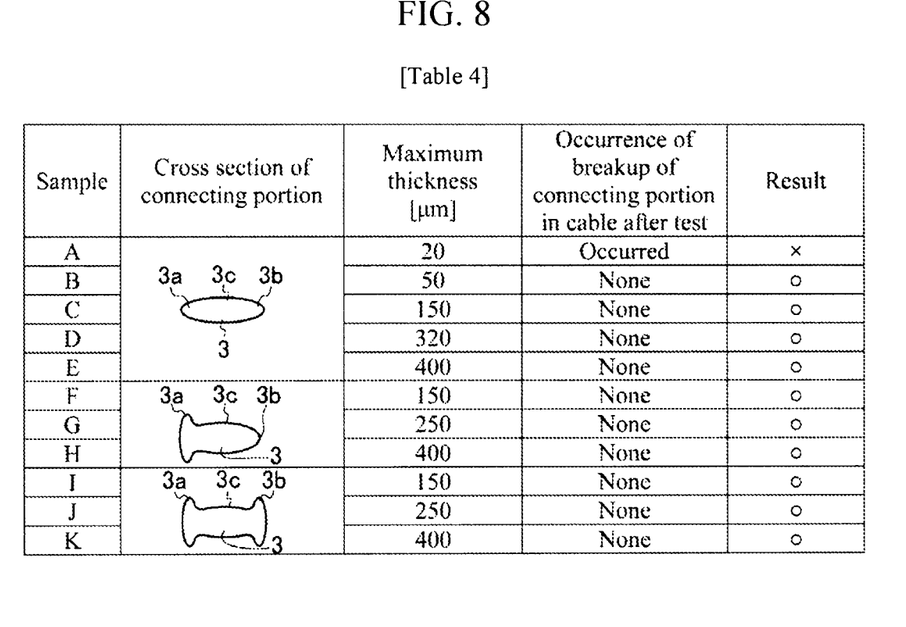
FIG. 8 is a view showing Table 4.

As is apparent from Table 4, the breakup of the connecting portions 3 was caused only when the thickest portion of the connecting portion 3 in cross section in the ribbon longitudinal direction X was located in the middle 3c and when the maximum thickness was 20 μm.

As an overall evaluation, the tests revealed that the connecting portions 3 can exhibit good mid-span access performance and have strength sufficient to prevent breakup thereof in the cable at the time of cable production or the like when the thickest portion of the connecting portion 3 in cross section in the ribbon longitudinal direction X is located not at the ends 3a and 3b but in the middle 3c and when the maximum thickness is in the range from 50 μm to 320 μm.

As described above, according to the optical fiber ribbon of the present invention, the split strength of the connecting portions of the intermittently-fixed structure is set in the range from 1.50 gf to 21.0 gf, so that the connecting portions can be split at the time of mid-span access, and an increase in transmission loss of the optical fibers can be prevented even when the connecting portions are split up. Further, the connecting portions are not broken even when external force is applied at the time of cable production and installation. Accordingly, the mid-span access performance and the cable production performance can be ensured concurrently.

Further, the optical fiber ribbon according to the present invention has a cross-sectional shape of the connecting portions 3 in the ribbon longitudinal direction which has a thickness gradually increasing in an arc from one side towards the middle, thickest in the middle and gradually decreasing in an arc towards the other side. Accordingly, the connecting portions can be easily split at the time of mid-span access and can be prevented from being broken up unintentionally at the time of cable production.

Further, the optical fiber ribbon of the present invention including the connecting portions with the maximum thickness set in the range from 50 μm to 320 μm, can prevent an increase in transmission loss of the optical fibers at the time of mid-span access and prevent breakup of the connecting portions even when external force is applied at the time of cable production and installation.

Further, the optical fiber cable housing the optical fiber ribbon according to the present invention can fulfill the mid-span access performance and the cable production performance concurrently.

INDUSTRIAL APPLICABILITY

The present invention can be applied to an optical fiber ribbon having an intermittently-fixed structure in which adjacent optical fibers are intermittently connected with connecting portions.

What is claimed is:

1. An optical fiber ribbon comprising three or more optical fibers arranged in parallel and connecting portions connecting the respective adjacent two optical fibers, the connecting portions being formed intermittently in each of a ribbon longitudinal direction and a ribbon width direction,
    wherein split strength of the connecting portions is in a range from 1.50 gf to 21.0 gf,
    wherein the connecting portions each is formed by filling a gap provided between the adjacent two optical fibers so as to adhere to each of the adjacent two optical fibers, the adjacent optical fibers being not in contact with each other, and
    wherein the connecting portions each have a thickness in cross section in the ribbon longitudinal direction perpendicular to the ribbon width direction that gradually increases in an arc from one side towards a middle, is thickest in the middle and gradually decreases in an arc towards another side.

2. The optical fiber ribbon according to claim 1, wherein the thickest thickness of the respective connecting portions is in a range from 50 μm to 320 μm.

3. An optical fiber cable housing the optical fiber ribbon according to claim 1.

* * * * *